US011004146B1

(12) United States Patent
Ram et al.

(10) Patent No.: US 11,004,146 B1
(45) Date of Patent: May 11, 2021

(54) BUSINESS HEALTH SCORE AND PREDICTION OF CREDIT WORTHINESS USING CREDIT WORTHINESS OF CUSTOMERS AND VENDORS

(71) Applicants: Siddharth Ram, Menlo Park, CA (US); Richard N. Preece, San Diego, CA (US); Joseph Timothy Callinan, Jr., Campbell, CA (US); Kathy Tsitovich, Mountain View, CA (US); Eva Diane Chang, Mountain View, CA (US)

(72) Inventors: Siddharth Ram, Menlo Park, CA (US); Richard N. Preece, San Diego, CA (US); Joseph Timothy Callinan, Jr., Campbell, CA (US); Kathy Tsitovich, Mountain View, CA (US); Eva Diane Chang, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 769 days.

(21) Appl. No.: 14/170,488

(22) Filed: Jan. 31, 2014

(51) Int. Cl.
*G06Q 40/02* (2012.01)

(52) U.S. Cl.
CPC ................... *G06Q 40/025* (2013.01)

(58) Field of Classification Search
CPC .. G06Q 10/06; G06Q 10/067; G06Q 10/0631; G06Q 30/04; G06Q 40/12; G06Q 10/0635; G06Q 20/4016; G06Q 30/02; G06Q 10/06398; G06Q 30/0201; G06Q 30/06; G06Q 40/06; G06F 17/30; G96F 17/18
USPC ............................................................ 705/38
See application file for complete search history.

(56) References Cited

U.S. PATENT DOCUMENTS

| 9,501,778 B2 * | 11/2016 | Batra | G06Q 30/02 |
| 2006/0200772 A1 * | 9/2006 | Dhanapal | G06Q 10/06 715/760 |
| 2007/0043608 A1 * | 2/2007 | May | G06Q 10/0633 705/7.27 |
| 2007/0050237 A1 * | 3/2007 | Tien | G06Q 10/00 705/7.39 |
| 2007/0100724 A1 * | 5/2007 | Hollas | G06Q 10/0635 705/36 R |
| 2008/0270448 A1 * | 10/2008 | Brennan | G06Q 10/06 |

(Continued)

OTHER PUBLICATIONS

Business Health ScoreCard by Jeffrey Scott (Year: 2019).*
Take a test: Determine your Small Business Health Score by Moltz (Year: 2014).*

*Primary Examiner* — Christine M Behncke
*Assistant Examiner* — Mary M Gregg
(74) *Attorney, Agent, or Firm* — Ferguson Braswell Fraser Kubasta PC (57) ABSTRACT

A method for generating a business health score of a business entity that includes identifying tools used to manage the business entity, obtaining business information from the tools, filtering the business information into at least one data category to obtain categorized business information, populating the categorized business information into a data silo, and analyzing, by a computer processor, the categorized business information in the data silo to create a composite business factor. The method also includes applying an algorithm to the composite business factor to generate a result, generating, based on the result, the business health score of the business entity, and providing the business health score to an interested entity.

24 Claims, 5 Drawing Sheets

(56) References Cited

U.S. PATENT DOCUMENTS

| | | | |
|---|---|---|---|
| 2009/0187447 A1* | 7/2009 | Cheng | G06Q 30/0205 705/7.34 |
| 2011/0270780 A1* | 11/2011 | Davies | G06Q 40/06 705/36 R |
| 2013/0132269 A1* | 5/2013 | Abiola | G06Q 40/025 705/38 |
| 2013/0218750 A1* | 8/2013 | Dornhelm | G06Q 40/02 705/38 |
| 2013/0317954 A1* | 11/2013 | Psota | G06Q 30/06 705/30 |
| 2014/0025441 A1* | 1/2014 | Eberlein | G06Q 10/06 705/7.39 |
| 2014/0278754 A1* | 9/2014 | Cronin | G06Q 30/0201 705/7.29 |
| 2014/0351269 A1* | 11/2014 | Kapoor | G09B 7/00 707/748 |
| 2014/0358604 A1* | 12/2014 | Gebhart | G06Q 10/0637 705/7.12 |
| 2015/0170076 A1* | 6/2015 | Pawar | G06Q 30/0201 705/7.28 |
| 2015/0302336 A1* | 10/2015 | Dhingra | G06Q 10/06393 705/7.28 |

* cited by examiner

BUSINESS HEALTH SCORE AND PREDICTION OF CREDIT WORTHINESS USING CREDIT WORTHINESS OF CUSTOMERS AND VENDORS

CROSS REFERENCE TO RELATED APPLICATIONS

This application is related to U.S. patent application Ser. No. 14/170,483, filed on Jan. 31, 2014, and entitled "Predicting the Credit Worthiness of a Consumer Using Personal Financial Management Software". This application is related to U.S. patent application Ser. No. 14/170,460, filed on Jan. 31, 2014, and entitled "Algorithm and Models for Creditworthiness Based on User Entered Data Within Financial Management Application". This application is also related to U.S. patent application Ser. No. 14/170,473, filed on Jan. 31, 2014, and entitled "Constructing Tranches of Small Business Loans With Predicted Rate of Return". Both U.S. patent application Ser. No. 14/170,460 and U.S. patent application Ser. No. 14/170,473 are hereby incorporated by reference in their entirety.

BACKGROUND

Business entities that offer goods and services to customers regularly have vendors that supply products or services to the business entity, as well as lenders that have or may lend money to the business entity. The business entity, as well as customers, venders, and lenders, are often in need of a way to assess the health of a business entity in order to make business decisions regarding the business entity. Credit scores of the business entity are often used to make such an assessment.

SUMMARY

In general, in one aspect, the invention relates to a method for generating a business health score of a business entity that includes identifying tools used to manage the business entity, obtaining business information from the tools, filtering the business information into at least one data category to obtain categorized business information, populating the categorized business information into a data silo, and analyzing, by a computer processor, the categorized business information in the data silo to create a composite business factor. The method also includes applying an algorithm to the composite business factor to generate a result, generating, based on the result, the business health score of the business entity, and providing the business health score to an interested entity.

In general, in one aspect, the invention relates to a system for generating a business health score of a business entity that includes a computer processor and a business management application (BMA) that includes functionality to obtain and store BMA information from the business entity. The system also includes a business health score tool executing on the computer processor that includes functionality to identify a tools (including the BMA) used to manage the business entity, obtain business information from the tools, filter the business information into at least one data category to obtain categorized business information, populate the categorized business information into a data silo, and provide the business health score to an interested entity. The system also includes a business information repository that includes functionality to store the categorized business information, such as BMA information, into the data silo. The system also includes a business health score generator executing on the computer processor that includes functionality to analyze the categorized business information in the data silo to create a composite business factor, apply an algorithm to the composite business factor to generate a result, and generate, based on the result, the business health score of the business entity.

In general, in one aspect, the invention relates to a non-transitory computer readable medium that includes instructions for generating a business health score of a business entity which, when executed by a computer, cause a computer processor to identify tools used to manage the business entity, obtain business information from the tools, filter the business information into at least one data category to obtain a categorized business information, populate the categorized business information into a data silo, and analyze, by a computer processor, the categorized business information in the data silo to create a composite business factor. The instructions also cause the computer processor to apply an algorithm to the composite business factor to generate a result, generate, based on the result, the business health score of the business entity, and provide the business health score to an interested entity.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for generating a business health score for a business entity. More specifically, in one or more embodiments of the invention, various types of information corresponding to a business entity are obtained from public information sources and from a business management application (BMA) used by the business entity. In one or more embodiments of the invention, the information is parsed and analyzed to obtain the business health score. In one or more embodiments of the invention, the business health score is provided to interested entities such as the business entity that the score corresponds to, customers of the business entity, vendors of the business entity, and lenders to the business entity.

Figure 1:
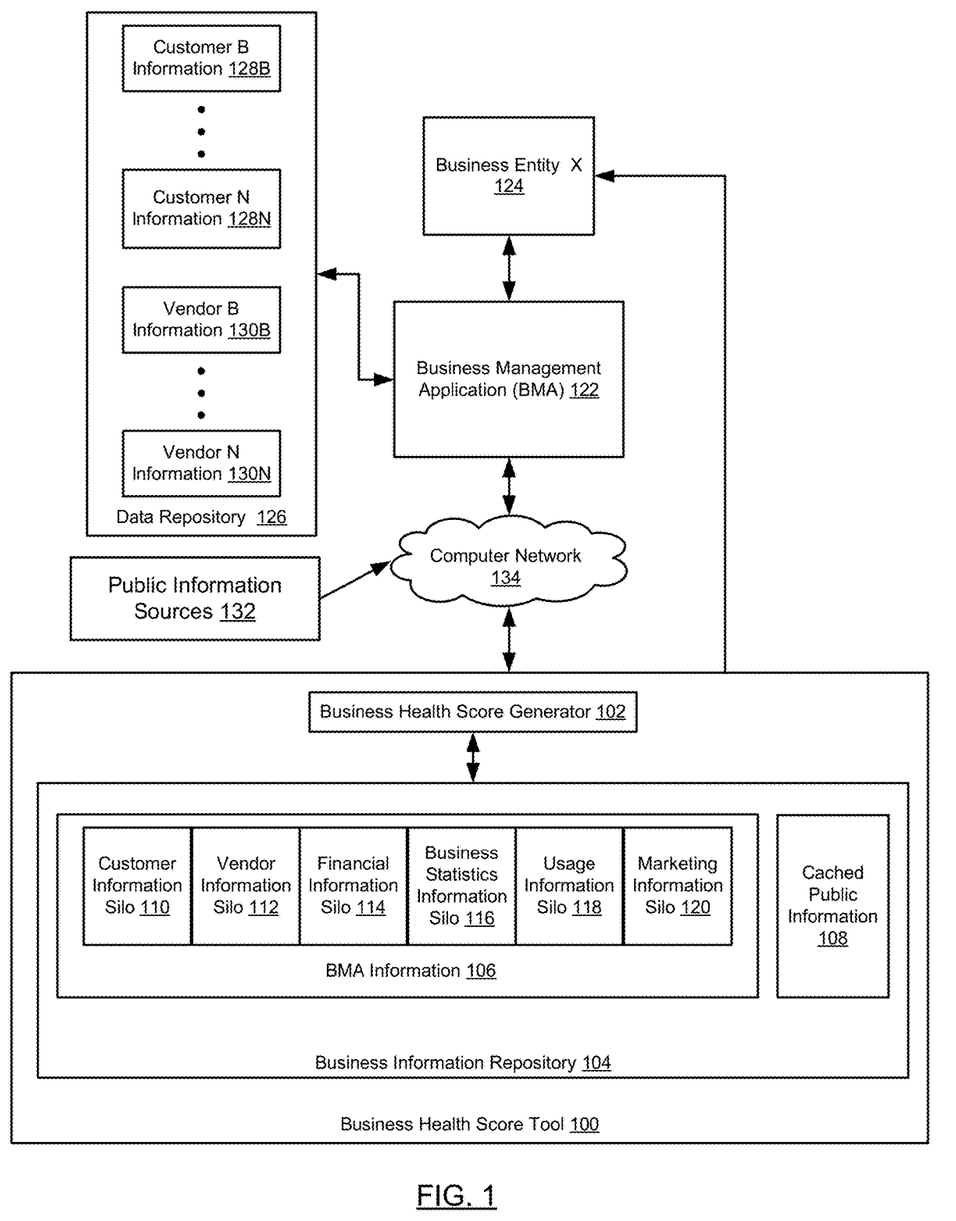
FIG. 1 shows a system in accordance with one or more embodiments of the invention.

FIG. 1. shows a system in accordance with one or more embodiments of the invention. In one or more embodiments of the invention, the system includes a business entity (e.g., business entity (124)) that uses a business management application (BMA) (e.g., BMA (122)) and is operatively connected to a business health score tool (e.g., business health score tool (100)). The BMA may be operatively connected via a computer network (e.g., computer network (134)) to the business health score tool. The BMA may have a data repository (e.g., data repository (126)). The data repository may include customer information (e.g., customer information B (128B), customer information N (128N)) and vendor information (e.g., vendor information B (130B), vendor information N (130N)). In one or more embodiments of the invention, the system also includes public information sources (e.g., public information sources (132)) operatively connected, via a computer network, to the business health score tool. In one or more embodiments of the invention, the business health score tool includes a business health score generator (e.g., business health score generator (102)) and a business information repository (e.g., business information repository (104)). The business information repository may include cached public information (e.g., cached public information (108)) and BMA information (e.g., BMA information (106)). In one or more embodiments of the invention, BMA information is organized in to various data silos such as a customer information silo (e.g., customer information silo (110)), a vendor information silo (e.g., vendor information silo (112)), a financial information silo (e.g., financial information silo (114)), a business statistics information silo (e.g., business statistics information silo (116)), a usage information silo (e.g., usage information silo (118)), and a marketing information silo (e.g., marketing information silo (120)). Each of these components is described below.

In one or more embodiments of the invention, a business entity (124) is any entity organized in order to offer goods and/or services for sale to customers (not shown). For example, a business entity may be a bicycle shop that services bicycles and also sells bicycles and related merchandise. A business entity may have vendors (not shown), from whom the business entity receives products and/or services. For example, a bicycle shop may have vendors that supply the merchandise that the bicycle shop sells, vendors that supply products used by the bicycle shop to service and/or sell bicycles and related merchandise, and vendors that supply services (e.g., facilities, energy, water, etc.) to the bicycle shop. In one or more embodiments of the invention, a business entity has lenders (not shown) from whom the business entity receives financing. The business entity may include any computing device configured with processing, data storage, and network communication functionality that enables functionality described in accordance with one or more embodiments of the invention.

In one or more embodiments of the invention, the business entity uses a BMA (e.g., BMA (122)). A BMA is any software designed to be used by a business entity to manage various aspects of the business in which the business entity is engaged. In one or more embodiments of the invention, the BMA is a software application written in any programming language that includes instructions stored in any non-transitory computer readable medium which, when executed by one or more processors in a computing device, enable the computing device to perform the functions described in accordance with one or more embodiments of the invention.

In one or more embodiments of the invention, the BMA is obtained from a software provider and installed and executed on a one or more computing devices of the business entity. In one or more embodiments of the invention, the BMA (122) is provided by an application service provider, such as a software as a service (SaaS). For example, the BMA (122) may be operated by the application service provider (ASP) and accessed by the business entities (e.g., business entity (124)) on a subscription basis.

In one or more embodiments of the invention, the BMA (122) may be an accounting application, a tax preparation application, a payroll application, a personnel application, any business management application, any combination thereof, or any other application for managing an aspect of the operations of a business entity.

The BMA (122) may include functionality to process and/or store data corresponding to customers of the business entity and vendors of the business entity. The BMA may include functionality to receive input from the business entity, from customers, from vendors, from lenders, or from any source that deals with the business entity and to whom the business entity has granted access to the BMA. Input from the business entity may be entered into the BMA by an employee, a consultant, a business owner, etc. of the business entity (124). In one or more embodiments of the invention, the BMA includes functionality to maintain information related to the use of the BMA by the business entity.

In one or more embodiments of the invention, the BMA (122) is operatively connected to a data repository (126). In one or more embodiments of the invention, a data repository is any type of storage unit and/or device (e.g., a file system, database, collection of tables, or any other storage mechanism) for storing data/information. Specifically, the data repository may include hardware and/or software. Further, the data repository may include multiple different storage units and/or devices. The multiple different storage units and/or devices may or may not be of the same type or located at the same physical site. In one or more embodiments of the invention, the data repository is included as a part of the BMA. In other embodiments of the invention, the data repository is a stand-alone repository that is accessed, at least, by the BMA.

In one or more embodiments of the invention, the data in the data repository (116) includes customer information (e.g., customer information B (128B)) and vendor information (e.g., vendor information B (130B)). Each of the types of information is discussed below.

In one or more embodiments of the invention, customer information corresponds to data about interactions between a customer and the business entity. For example, customer information may include information regarding goods or services a given customer has purchased, how many times the customer has made purchases, total and per-purchase money spent by the customer, frequency with which the customer visits the business entity either physically and/or online, status of the customer's account with the business entity (e.g., paid-in-full, delinquent, etc.), proximity of the customer to the business entity, complaints made by a customer about the business entity, etc. Customer information may also include information about the customer such as address and contact information. Customer information may also refer to aggregate customer information about all of the customers of a business entity, or a portion thereof (e.g., all customer information between customer B and customer N or a subset). For example, customer information may include quantity of customers and related trends (e.g., quantity increasing, quantity decreasing, etc.).

In one or more embodiments of the invention, vendor information (e.g., vendor information B (130B)) corresponds to data about interactions between a vendor and the business entity. For example, vendor information may include information about purchases of products or services from the vendor made by the business entity, payments made or owed to the vendor by the business entity, frequency of payments to the vendor, length of time the vendor has had a relationship with the business entity, complaints made by the vendor about the business entity, etc. Vendor information may also refer to aggregate vendor information about all of the vendors of a business entity, or a portion thereof (e.g., vendor information regarding all vendors between vendor B and vendor N or a subset). For example, vendor information may include quantity of vendors, total outstanding amount owed to vendors, etc.

In one or more embodiments of the invention, the BMA (122) is connected to a computer network (e.g., computer network (134)). In one or more embodiments of the invention, the computer network may include a cellular phone network, a wide area network, a local area network, a public switched telephone network, or any other suitable network that facilitates the exchange of information from one part of the network to another. In one or more embodiments, the computer network is coupled with or overlaps the Internet.

In one or more embodiments of the invention, also connected to the computer network are public information sources (e.g., public information sources (132)). In one or more embodiments of the invention, public information is publically available information corresponding to the business entity. For example, several sources regularly generate credit ratings for business entities that are available as public information. Public information may be freely available to the general public or may be provided in exchange for some form of compensation (e.g., paid subscription).

In one or more embodiments of the invention, also connected to the computer network is a business health score tool (e.g., business health score tool (100)). In one or more embodiments of the invention, the business health score tool is a software application, or collection of software applications written in any programming language that includes instructions stored in any non-transitory computer readable medium which, when executed by one or more processors in a computing device, enable the computing device to perform the functions described in accordance with one or more embodiments of the invention. In one or more embodiments of the invention, the business health score tool is operated by a seller from which a business entity obtained a BMA (e.g., BMA (122)). In other embodiments, the business health score tool is operated by a third party that is neither the business entity nor the seller of the BMA.

In one or more embodiments of the invention, the business health score tool (100) includes functionality to obtain, via the computer network (134), the public information from the public information sources (132). In one or more embodiments of the invention, the business health score tool includes functionality to obtain BMA information (e.g., BMA information (106)) from the BMA of one or more business entities. In one or more embodiments of the invention, the business health score tool includes functionality to maintain a record of the business health scores generated for one or more business entities (e.g., business entity (124)). In one or more embodiments of the invention, the business health score tool includes functionality to provide a business health score to interested entities (not shown). For example, the business health score tool may be configured to provide the business health score to the business entity the score corresponds to. As another example, the business health score tool may be configured to provide the business health score to customers, vendors, and lenders of the business entity.

In one or more embodiments of the invention, the business health score tool (100) includes a business information repository (e.g., business information repository (104)). In one or more embodiments of the invention, a business information repository, similar to the data repository (126), is any type of storage unit and/or device (e.g., a file system, database, collection of tables, or any other storage mechanism) for storing data/information. Specifically, the business information repository may include hardware and/or software. Further, the business information repository may include multiple different storage units and/or devices. The multiple different storage units and/or devices may or may not be of the same type or located at the same physical site. In one or more embodiments of the invention, the business information repository is included as a part of the business health score tool (100). In other embodiments of the invention, the business information repository is a stand-alone repository that is accessed, at least, by the business health score tool. The business information repository includes functionality to store BMA information (106) obtained by the business health score tool (100) from the BMA (122) of one or more business entities (e.g., business entity (124)) along with public information obtained from the public information sources (132).

In one or more embodiments of the invention, the business information repository (104) includes cached public information (e.g., cached public information (108)). Cached public information may be information obtained via the computer network (134) from the public information sources (e.g., public information sources (132)). Cached public information may be a copy of the public information, or a portion thereof, at a given point in time. The cached public information may be updated periodically or updated in response to a request for a business health score to be generated. In one or more embodiments of the invention, the cached public information is used to calculate a composite business factor (not shown) corresponding to the public information.

In one or more embodiments of the invention, the business information repository (104) includes BMA information (e.g., BMA information (106)). BMA information is information corresponding to one or more business entities that is obtained by the business health score tool (100) from the BMA of one or more business entities. BMA information includes a customer information silo (e.g., customer information silo (110)) vendor information silo (e.g., vendor information silo (112)), financial information silo (e.g., financial information silo (114)), business statistics information silo (e.g., business statistics information silo (116)), usage information silo (e.g., usage information silo (118)), and marketing information silo (e.g., marketing information silo (120)). Each of these information silos is described below.

In one or more embodiments of the invention, a customer information silo (110) is a construct (e.g., a database) in which to store customer information related to customers of one or more business entities (e.g., business entity (124)). Customer information stored in the customer information silo is substantially similar to the customer information described above that is stored in the data repository (e.g., data repository (126)) of one or more business entities (e.g., business entity (124)). In one or more embodiments of the invention, customer information is a portion of the BMA information (106) obtained by the business health score tool (100) from the BMA (e.g., BMA 122) of one or more business entities (e.g., business entity (124)). In one or more embodiments of the invention, customer information in the customer information silo corresponding to a given business entity is used by the business health score tool (100) to create a composite business factor (not shown).

In one or more embodiments of the invention, a vendor information silo (e.g., vendor information silo (112)) is a construct (e.g., database) in which to store vendor information related to vendors of one or more business entities (e.g., business entity (124)). Vendor information stored in the vendor information silo is substantially similar to the customer information described above that is stored in the data repository (e.g., data repository (126)) of one or more business entities (e.g., business entity (124)). In one or more embodiments of the invention, vendor information is a portion of the BMA information obtained by the business health score tool (100) from the BMA (e.g., BMA (122)) of one or more business entities. In one or more embodiments of the invention, vendor information in the vendor information silo corresponding to a given business entity is used by the business health score tool (100) to create a composite business factor (not shown).

In one or more embodiments of the invention, a financial information silo (e.g., financial information silo (114)) is a construct in which to store financial information related to one or more business entities (e.g., business entity (124)). Financial information includes, but is not limited to, information about the finances of a business entity such as number and type of lines of credit, interest rates received on loans or revolving lines of credit, cash flow, outstanding debt, loan payment history, savings, and liquid assets whether readily available or not. In one or more embodiments of the invention, financial information is a portion of the BMA information (106) obtained by the business health score tool (100) from the BMA (e.g., BMA 122) of one or more business entities (e.g., business entity (124)). In one or more embodiments of the invention, financial information in the financial information silo (114) corresponding to a given business entity is used by the business health score tool (100) to create a composite business factor (not shown).

In one or more embodiments of the invention, a business statistics information silo (e.g., business statistics information silo (116)) is a construct in which to store business statistics information corresponding to one or more business entities (e.g., business entity (124)). Business statistics information includes, but is not limited to, business statistics of a business entity such as accounts receivable, inventory on hand, inventory level over time, amount of time goods remain in inventory, number of employees, rate of employee turnover, labor costs, and frequency of discount sales. In one or more embodiments of the invention, business statistics information includes information about the variability over time of one or more business statistics. In one or more embodiments of the invention, business statistics information is a portion of the BMA information (106) obtained by the business health score tool (100) from the BMA (e.g., BMA (122)) of one or more business entities (e.g., business entity (124)). In one or more embodiments of the invention, business statistics information in the business statistics information silo (116) corresponding to a given business entity is used by the business health score tool (100) to create a composite business factor (not shown).

In one or more embodiments of the invention, a usage information silo (e.g., usage information silo (118)) is a construct in which to store usage information corresponding to one or more business entities (e.g., business entity (124)). Usage information includes, but is not limited to, usage of a BMA (122) by a business entity (124). For example, usage information may include statistics or other behavioral information representing how the BMA is used by the business entity and with what frequency. In one or more embodiments of the invention, usage information is a portion of the BMA information (106) obtained by the business health score tool (100) from the BMA of one or more business entities. In one or more embodiments of the invention, usage information in the usage information silo (118) corresponding to a given business entity is used by the business health score tool (100) to create a composite business factor (not shown).

In one or more embodiments of the invention, a marketing information silo (e.g., marketing information silo (120)) is a construct in which to store marketing information corresponding to one or more business entities (e.g., business entity (124)). Marketing information includes, but is not limited to, responsiveness of a business entity to marketing of the BMA and/or its features, marketing activities undertaken by a business entity, and customer response to marketing activities undertaken by a business entity. In one or more embodiments of the invention, marketing information is a portion of the BMA information (106) obtained by the business health score tool (100) from the BMA of one or more business entities. In one or more embodiments of the invention, marketing information in the marketing information silo (120) corresponding to a given business entity is used by the business health score tool (100) to create a composite business factor (not shown).

In one or more embodiments of the invention, the business health score tool (100) includes a business health score generator (e.g., business health score generator (102)). In one or more embodiments of the invention, the business health score generator is a software application, or portion of a software application written in any programming language that includes instructions stored in any non-transitory computer readable medium which, when executed by one or more processors in a computing device, enable the computing device to perform the functions described in accordance with one or more embodiments of the invention. In one or more embodiments of the invention, the business health score generator includes functionality to use the composite business factors created by the business health score tool (100) corresponding to each of the information silos in the BMA information (106), along with the cached public information (108) to generate a business health score corresponding to a business entity (e.g., business entity (124)). In one or more embodiments of the invention, the business health score generator includes a weighted algorithm (not shown) that is applied to the various composite business factors to obtain the business health score of a business entity.

While FIG. 1 shows a configuration of components, other configurations may be used without departing from the scope of the invention. For example, various components may be combined to create a single component. As another example, the functionality performed by a single component may be performed by two or more components. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

Figure 2:
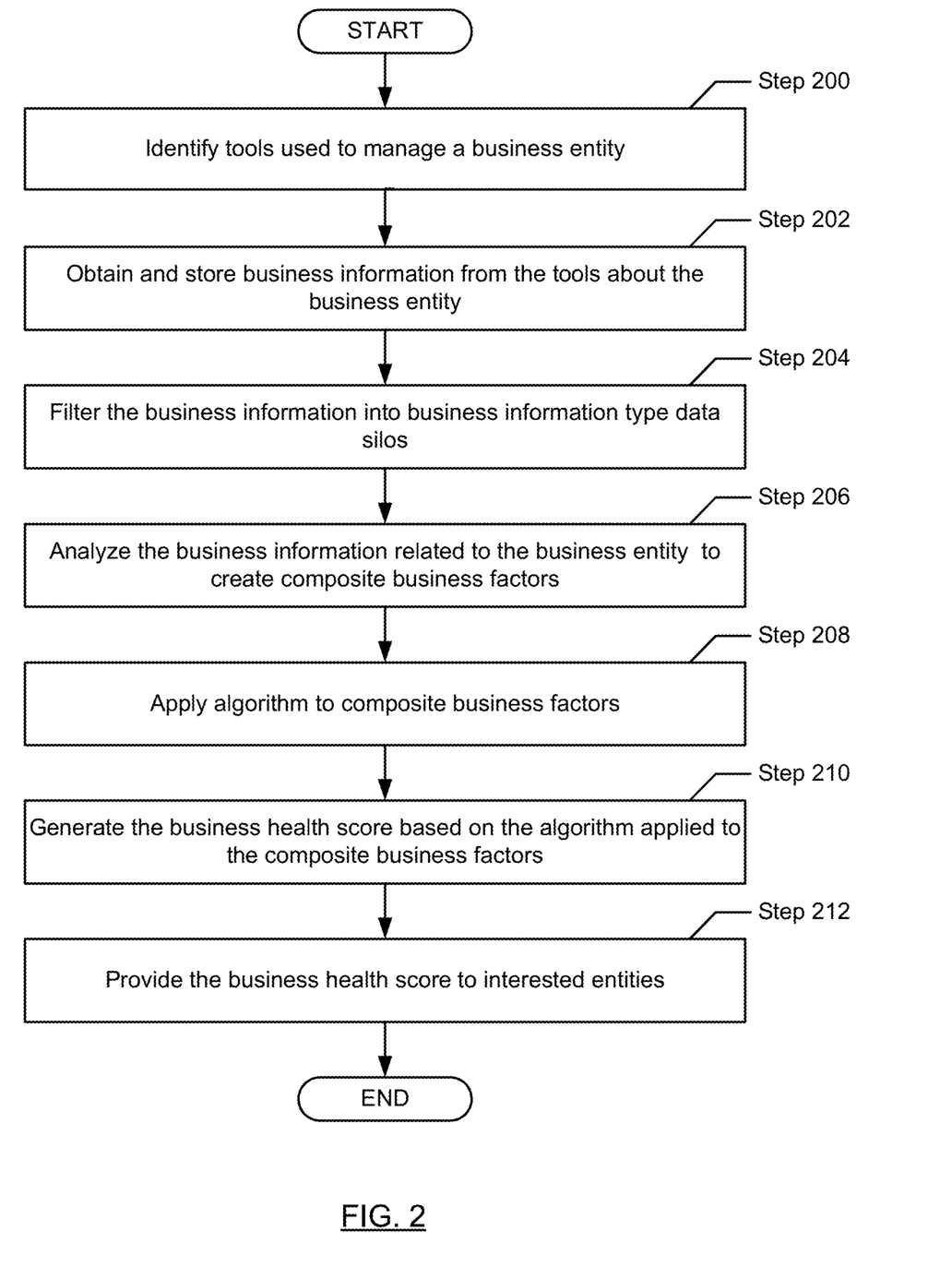
FIG. 2 shows a flowchart in accordance with one or more embodiments of the invention.

FIG. 2 shows a flowchart in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart describing a method for generating a business health score in accordance with one or more embodiments of the invention. In Step 200, tools used to manage a business entity are identified. In one or more embodiments of the invention, tools used to manage a business entity include public information sources and a BMA. Identification of one or more public information sources may include discovering which public information sources are available via the computer network and, unless the public information are freely available, subscribing to receive public information corresponding to a one or more business entities from the public information sources. Identification of a BMA may include determining which software application (or applications) is (are) used by a business entity to manage operations and ensuring that the BMA may be accessed via the computer network by the business health tool.

In Step 202, the business health score tool obtains and stores business information corresponding to one or more business entities in accordance with one or more embodiments of the invention. In one or more embodiments of the invention, obtaining the business information includes sending a request to the public information sources and the BMA of one or more business entities to transmit the business information to the business health score tool. In other embodiments of the invention, after the business health score tool establishes a connection with the public information sources and with the BMA, the business information is scheduled to be transmitted periodically to the business health score tool. In other embodiments, the business information is transmitted only upon request. Storing the business information may include writing the received business information in to a portion of the non-transitory computer-readable medium included with or attached to the business health score tool. In one or more embodiments of the invention, storing the business information also includes storing the public information received from one or more public information sources in the cached public information storage medium included in or attached to the business health score tool.

In Step 204, the obtained and stored business information is filtered into data silos based on business information type. In one or more embodiments of the invention, filtering includes applying a higher order function to the received business data to determine the type of business information a given piece of business information is. In one or more embodiments of the invention, for example, information related to customers of a business entity is filtered into the customer information silo by applying a higher order function that checks each piece of business information to determine if the information relates to a customer of a business entity. Another example may be checking the source of the received business information to determine if the business information was received from public information sources or a BMA. If the business information is received from a public information source, the business information is public information and is placed with the cached public information. In one or more embodiments of the invention, the filter is capable of identifying and categorizing business information as customer information, vendor information, financial information, business statistics information, usage information, marketing information, and public information, and then storing the filtered business information in the corresponding business information silo.

In Step 206, the business information in each of the business information silos is analyzed by the business health score tool to create composite business factors in accordance with one or more embodiments of the invention.

In one or more embodiments of the invention, the business information in a business information silo corresponding to a business entity is analyzed relative to standards of business health for the type of business information. The standards of business health may exist for each of the business information silos and be stored with the business health score tool. For example, the business health score tool may be programmed to rate, in part, the health of a business entity by determining the frequency with which the business entity fails to make payments to vendors and whether or not the frequency is increasing or decreasing over time. In one or more embodiments of the invention, the partial rating is combined with similar analysis performed on other aspects of the vendor information to create a vendor information composite business score. For example, the number of vendors paid in the last 120 days might have a weighting 'three' and number of total vendors used in the last 120 days might have a weighting 'one'. These scores may be added to others and the total summed score may be used to create the composite business factor for the vendor information silo. In one or more embodiments of the invention, business information corresponding to a given business entity from each of the business information silos is analyzed to create a separate composite business factor for each business information type as well as for the cached public information. In one or more embodiments of the invention, a composite business factor is a number. The number may be an aggregate sum of the results of one or more analyses performed on business information in a business information silo, or may be normalized, for example, to always be a number between zero and one.

In Step 208, a weighted algorithm is applied to the composite business factors of a business entity by the business health score generator in accordance with one or more embodiments of the invention. In one or more embodiments of the invention, each of the business information types is assigned a "weight" (i.e., level of relative importance) to be applied to each of the composite business factors corresponding to a business entity. In one or more embodiments of the invention, the weight assigned to each composite business factor may be a percentage or fraction of one, with the total of all fractions summing to one (i.e., 100%). In such embodiments, a higher fraction places more weight on a factor. For example, business statistics information may be weighted at 20% (i.e., ⅕) of the business health score. Thus, the business health score generator multiplies the composite business factor created by the business health score tool corresponding to business statistics information of a business entity by 0.2. In one or more embodiments of the invention, similar application of the weighted algorithm is performed on business information corresponding to a business entity from each of the business information silos in the business information repository as well as the cached public information.

In one or more embodiments of the invention, the business health score is generated by the business health score generator using a machine learning model (e.g., based on an adaptively determined matching algorithm such as a rule ensemble method) that predicts a business health score based on input data (e.g., the business information obtained from the BMA and public information sources). In one or more embodiments of the invention, the adaptively determined matching algorithm is trained to correlate a given business health score with the actual health of business entities. Said another way, the algorithm learns, by correlating business information of one or more business entities with the actual incidence of negative business situations, whether a given business entity is likely to be the cause of a negative business situation (e.g., failing to make timely loan repayments, failing to pay promptly for goods and/or services, or having a dissatisfied customer base). The business information about one or more actual business entities may be used as a training data set through which the algorithm "learns" the likelihood of a future negative business situations based on business information and generates a business health score based on the learned correlation between business information and business health.

In Step 210, a business health score corresponding to a business entity is generated in accordance with one or more embodiments of the invention. In one or more embodiments of the invention, the results of applying the weighted algorithm to the composite business factors are summed by the business health score generator to obtain as a result the business health score for the business entity. For example, customer information may have a weight of 15%, the vendor information may have a weight of 20%, the financial information may have a weight of 10%, the business statistics information may have a weight of 20%, the usage information may have a weight of 10%, the marketing information may have a weight of 10%, and the cached public information may have a weight of 15%. If each of the composite business factors generated by the business health score tool is normalized between zero and one, and the business health score is calculated as a percentage, the greatest possible score is 100% and is obtained if each of the composite business factors corresponding to a business entity is equal to one.

In one or more embodiments of the invention, the business health score output by the business health score generator is a number. In other embodiments, the business health score may be a percentage, or may be a letter grade that is assigned by the business health score generator based on the results of applying the weighted algorithm. In one or more embodiments of the invention, business health scores generated by the business health score generator are stored in a repository of generated business health scores.

In Step 212, the business health score generated by the business health score generator is provided to interested entities in accordance with one or more embodiments of the invention. In one or more embodiments of the invention, interested entities includes the business entity to whom the generated business health score corresponds, customers of the business entity, vendors of the business entity, and lenders (or potential lenders) to the business entity. In one or more embodiments of the invention, the business entity is provided the business health score by the business health score tool upon request. In other embodiments of the invention, the business health score tool includes functionality to generate an offer to the business entity to provide the business health score.

In one or more embodiments of the invention, the business health score is provided to a business entity along with an accompanying offer to the business entity to assist the business entity in improving and/or properly managing the business health score of the business entity. In one or more embodiments of the invention, customers (including other business entities), vendors (including other business entities), and lenders may indicate interest by requesting to be made aware of business entities that have a achieved a minimum business health score, or that have fallen below a minimum health score, in order to help evaluate whether the interested entity wants to engage in business with any of the scored business entities. In such embodiments, the business health tool compares the business health scores stored in a repository by the business health score generator in Step 210 to the desired business health score parameter provided by the interested entity in order to discover which business entities have business health scores that meet the requirements of the one or more interested entities.

Figure 3:
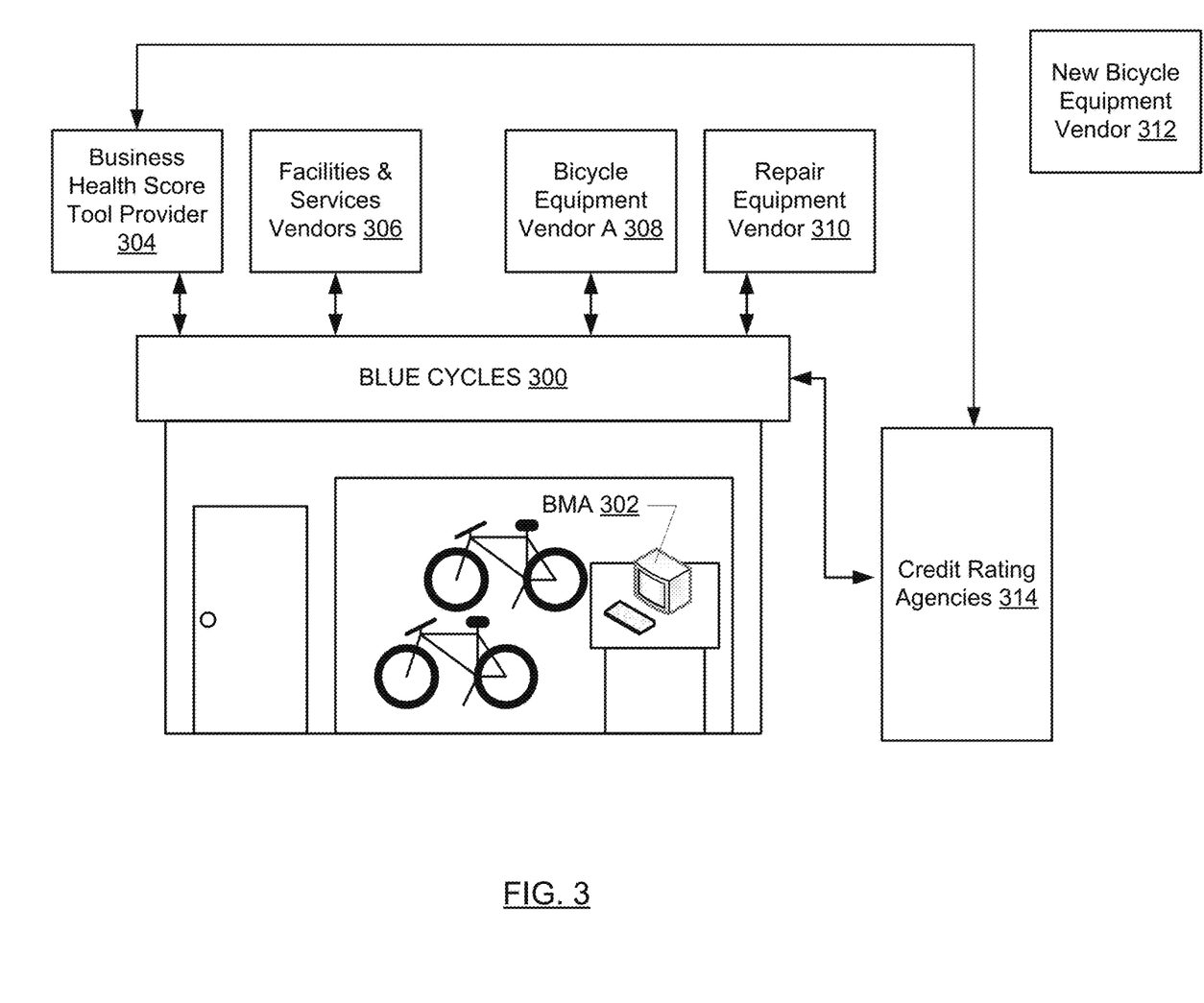
FIG. 3 shows an example in accordance with one or more embodiments of the invention.

FIG. 3 shows an example in accordance with one or more embodiments of the invention. The following example is for explanatory purposes only and not intended to limit the scope of the invention.

Referring to FIG. 3, consider a scenario in which a bicycle equipment vendor (e.g., New Bicycle Equipment Vendor (312)) is attempting to discover new business entities (e.g., bicycle shops) to which to sell bicycles and related equipment. The bicycle equipment vendor sells only premium bicycles and related equipment and is interested in doing business only with bicycle shops that traditionally have good relations with customers, vendors, and lenders, and that are otherwise highly rated in regards to the health of the bicycle shop's business. A business health score tool provider (e.g., business health score tool provider (304)) that is also a seller of a BMA (e.g., BMA (302)) used by bicycle shops advertises to New Bicycle Equipment Vendor that for a subscription fee, bicycle equipment vendor B may request "on-demand" to receive a list of bicycle shops that have a minimum score that is deemed sufficient by New Bicycle Equipment Vendor. After examining the details of the scoring algorithm used by the business health score tool provider, New Bicycle Equipment Vendor decides to subscribe and request a list of bicycle shops that have at least an 80% business health score.

Continuing with the scenario, Blue Cycles (300) is a bicycle shop on the west side of town. The name of the shop notwithstanding, Blue Cycles sells bicycles of all colors, as well as related bicycle equipment. Blue Cycles also offers repair services for bicycles. Blue Cycles pays rent to the owner of the building in which Blue Cycles operates, as well as various utilities companies for water, electricity, gas (collectively, e.g., facilities and services vendors (306)). Additionally, Blue Cycles already receives bicycle equipment from a bicycle equipment vendor (e.g., bicycle equipment vendor A (308)) and equipment with which to make repairs from a repair equipment vendor (e.g., repair equipment vendor (310)). Blue Cycles has been in business in the same location for twenty-seven years and has a large and loyal customer base (not shown). Blue Cycles has three lenders (not shown) from which Blue Cycles receives or has received funding from and that Blue Cycles has a recurring obligation to make payments to. Blue Cycles has acquired a BMA (e.g., BMA (302)) from the business health score tool provider (304), and uses the BMA to manage most aspects of its business on a daily basis. Blue Cycles has been using the BMA for ten years. As a part of the on-going BMA licensing agreement, Blue Cycles has agreed that information about Blue Cycles may be obtained from the BMA by the business health score tool for the purpose of generating a business health score.

The business health score tool of the business health score tool provider includes a business health score generator that applies a weighted algorithm to composite business factors generated by the business health score tool from various business information silos. In the weighted algorithm, customer information (CI) has a weight of 15%, vendor information (VI) has a weight of 20%, financial information (FI) has a weight of 10%, business statistics information (BSI) has a weight of 20%, usage information (UI) has a weight of 10%, marketing information (MI) has a weight of 10%, and cached public information (CPI) has a weight of 15%. Thus the algorithm for generating a business health score is as follows:

$$\text{business health score (as a percentage)} = (0.15*CI + 0.20*VI + 0.10*FI + 0.20*BSI + 0.10*UI + 0.10*MI + 0.15*CPI)*100$$

The business health score tool obtains publicly available credit scores for Blue Cycles from three credit ratings agencies (e.g., credit ratings agencies (314)) once a month and stores the credit scores in the cached public information. Additionally, the business health score tool obtains customer information, vendor information, financial information, business statistics information, usage information, and marketing information from the BMA used by Blue Cycles. The business information obtained from the BMA is filtered into the appropriate business information silo and the business health score tool uses the information in each silo to generate a composite business factor for each type of business information, including the cached public information. The composite business factors are normalized to a value between zero and one before the weighted algorithm is applied.

In regards to customer information, Blue Cycles has many customers, many of whom are repeat customers. Customers are generally happy with the experience at Blue Cycles and a sizable percentage tends to purchase the bicycle, parts for the bicycle, and subsequent repairs all from Blue Cycles. Overall, this garners a composite business factor of 0.95 for the customer information silo.

In regards to vendor information, Blue Cycles usually pays bicycle equipment vendor A (308) on time and purchases a steady amount of products over time. Blue Cycles also has never missed a utility payment. However, Blue Cycles has failed, on occasion, to make rent payment for the shop on time. The delinquency has never been reported to a credit rating agency by the landlord, who prefers to take matters into his own hands and show up at the shop in person to demand payment in the event that payment is late. The frequency of the delinquent payments is high (about 63%). Overall, Blue Cycles garners a composite business factor of 0.45 for the vendor information silo due mostly to the frequently delinquent rent payments.

In regards to financial information, Blue Cycles has three revolving lines of credit, which Blue Cycles uses to make payments to vendors. One, obtained shortly after the shop opened, has an interest rate of 10%. The other two, obtained more recently, each have an interest rate of 5%. Blue Cycles makes about 90% of the total dollar amount of payments to vendors using the two revolving credit lines with the 5% interest rate. Blue Cycles keeps an amount of liquid assets (mostly cash) in accounts that total about six times the average monthly operating expenses of the shop. Overall, Blue Cycles garners a composite business factor of 0.80 for the financial information silo.

In regards to business statistics information, Blue Cycles does not offer financing, so all payments to the shop are made at the time of sale or the completion of repair, meaning there are no accounts receivable. Blue Cycles maintain an inventory of about 50 bicycles at all times in the store as well as between 3 and 5, on average, of 127 other products. Blue Cycles has twelve employees. The employees are not well compensated relative to other bicycle shop employees in the bicycle shop industry, which results in a workforce with a high turnover ratio. Overall, Blue Cycles garners a composite business factor of 0.65 for the business statistics information silo.

In regards to usage information, Blue Cycles uses the BMA on a daily basis for managing most aspects of its business. The usage indicates that although there are some problems (e.g., missed rent), the problems do not arise because Blue Cycles is not aware of the need to pay, as the BMA tracks such information for Blue Cycles. The high frequency of BMA use, tempered by the occasional ignoring of missed payments, garners Blue Cycles a composite business factor of 0.82 for the usage information silo.

In regards to marketing information, Blue Cycles decided at the outset of the business that Blue Cycles would engage in no significant advertising. Instead, Blue Cycles has relied almost exclusively on "word-of-mouth advertising". While word-of-mouth advertising has worked successfully enough since the shop opened, changes in the area in which Blue Cycles in located in to a less residential area have started, in recent months, to cause the customer base of Blue Cycles to begin to erode, and the lack of advertising contributes to the lack of new customers to make up for the customers lost. Additionally, Blue Cycles does respond well to advertising from the business health tool provider, which also supplies the BMA, regarding the BMA. Blue Cycles make timely updates to the software and have been responsive to several offers in the past to acquire enhanced versions of the BMA that allow for better business management. Overall, Blue Cycles garners a composite business factor of 0.55 for the marketing information silo.

Blue Cycles rarely makes a late payment for anything other than rent. The delinquent rent payment is not reported to any credit rating agency (e.g., credit rating agencies (314)). Therefore, the credit rating from all three credit agency ratings is very high for Blue Cycles. The business health score tool thus calculates a composite business factor of 0.95 with regard to the cached public information.

The business health score generator thus calculates the score as follows:

$$\text{business health score (as a percentage)} = (0.15*CI + 0.20*VI + 0.10*FI + 0.20*BSI + 0.10*UI + 0.10*MI + 0.15*CPI)*100 = (0.15*0.95 + 0.20*0.45 + 0.10*0.80 + 0.20*0.65 + 0.10*0.82 + 0.10*0.55 + 0.15*0.95)*100 = 72\%$$

With a business health score of 72%, Blue Cycles fails to meet the minimum requirement of New Bicycle Equipment Vendor (i.e., 80%). Thus, the business health score assists New Bicycle Equipment Vendor in making a decision against engaging in business with Blue Cycles even though Blue Cycles has high credit ratings from the credit ratings agencies.

Additionally, Blue Cycles also contacted the business health score tool provider to request a business health score. When the business health score tool provider supplied the business health score to Blue Cycles, the business health score tool provider also sent an offer to Blue Cycles for a service through which the business health score tool provider will work with Blue Cycles to improve the business health score. Blue Cycles acted on the offer and engaged the business health score tool provider in the score-improving service. After a few months, the business health score of Blue Cycles began to improve as Blue Cycles began addressing the factors that were lowering the score, such as the delinquent rent payments, low employee compensation, high employee turnover rate, and lack of marketing.

Figure 4:
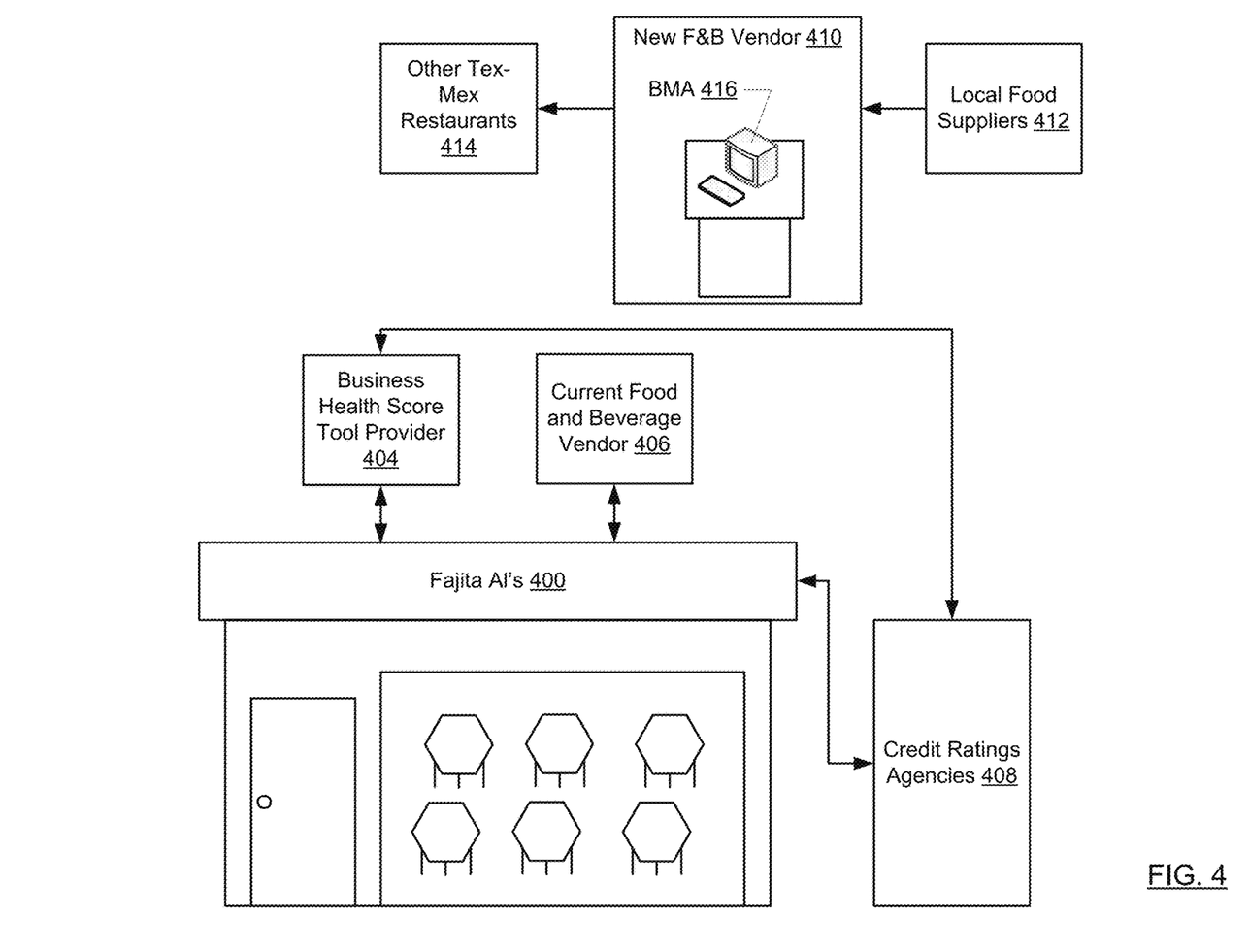
FIG. 4 shows an example in accordance with one or more embodiments of the invention.

FIG. 4 shows an example in accordance with one or more embodiments of the invention. The following example is for explanatory purposes only and not intended to limit the scope of the invention.

Referring to FIG. 4, consider a scenario in which a restaurant (e.g., Fajita Al's (400)) is attempting to discover a new food and beverage vendor (e.g., New F&B Vendor (410)) from whom to acquire the food and beverage products needed to operate Fajita Al's. The search for a new food and beverage vendor is prompted by a desire to diversify the suppliers of Fajita Al's to create competition between vendors, and also because the current food and beverage vendor (e.g., current food and beverage vendor (406)) has become inconsistent with regard to price, quality, and consistency of delivery time. Fajita Al's is also concerned that the current food and beverage vendor is not focused on providing products specifically to tex-mex restaurants. Additionally, Fajita Al's would like to have a food and beverage vendor that sources food products locally if possible. A business health score tool provider (e.g., business health score tool provider (404)) that is also a seller of the BMA (not shown) used by Fajita Al's to manage operations. Fajita Al's contacts the business health score tool provider and, after noting that the factors that are important to Fajita Al's are taken into account when generating a business health score, decides to request a list of food and beverage vendors that have a minimum business health score of 85%.

Continuing with the scenario, New F&B Vendor (410) is a food and beverage vendor that specializes in supplying food and beverage products to tex-mex restaurants (e.g., other tex-mex restaurants (414)) that operate in the city in which Fajita Al's is based. New F&B Vendor sources the majority of the produce New F&B Vendor sells from farmers (e.g., local food suppliers (412)) local to the area that Fajita Al's operates in, as well as roughly half of the meat sold. New F&B Vendor has been in business for twenty-seven years. New F&B Vendor makes product quality a priority. New F&B Vendor also has as a priority consistency with regard to service and product provided to each customer restaurant to which food and beverage product is supplied. New F&B Vendor uses a BMA (e.g., BMA (416)) to manage operations and has done so since the inception of the business. As a part of the on-going BMA licensing agreement, New F&B Vendor has agreed that information about New F&B Vendor may be obtained from the BMA by the business health score tool for the purpose of generating a business health score.

The business health score tool of the business health score tool provider includes a business health score generator that applies a weighted algorithm to composite business factors generated by the business health score tool from various business information silos. In the weighted algorithm, customer information (CI) has a weight of 15%, vendor information (VI) has a weight of 20%, financial information (FI) has a weight of 10%, business statistics information (BSI) has a weight of 20%, usage information (UI) has a weight of 10%, marketing information (MI) has a weight of 10%, and cached public information (CPI) has a weight of 15%. Thus the algorithm for generating a business health score is as follows:

$$\text{business health score (as a percentage)} = (0.15*CI + 0.20*VI + 0.10*FI + 0.20*BSI + 0.10*UI + 0.10*MI + 0.15*CPI)*100$$

The business health score tool obtains publicly available credit scores for New F&B Vendor from three credit ratings agencies (e.g., credit ratings agencies (408)) once a month and stores the credit scores in the cached public information. Additionally, the business health score tool obtains customer information, vendor information, financial information, business statistics information, usage information, and marketing information from the BMA (416) used by New F&B Vendor. The business information obtained from the BMA is filtered into the appropriate business information silo and the business health tool uses the information in each silo to generate a composite business factor for each type of business information, including the cached public information. The composite business factors are normalized to a value between zero and one before the weighted algorithm is applied.

In regards to customer information, New F&B Vendor supplies forty-three tex-mex restaurants currently, and the rate of increase has been steady at around 10% for eight years. Restaurants supplied by New F&B Vendor receive consistent pricing, and delivery times remain constant and are the same across the restaurants supplied by New F&B Vendor. In other words, New F&B does not engage in preferential treatment for any customers, choosing instead to treat each customer fairly and evenly. New F&B Customers also appreciate the consistently high food quality and that much of the food is acquired from local sources. Overall, this garners New F&B Vendor a composite business factor, as calculated by the business health tool of the business health provider, of 0.97 for the customer information silo.

In regards to vendor information, New F&B Vendor usually pays its suppliers on time and is purchasing a steadily increasing amount as New F&B Vendor acquires new tex-mex restaurant customers. The vendors used by New F&B Vendor are about 75% local with regards to food products. Beverage products sold by New F&B Vendor are standard soft drink products from a major soft drink company. New F&B Vendor enjoys good relationships with all of its vendors, and keeps several per type of food to ensure redundancy, which helps New F&B Vendor maintain consistency of delivery time for all customers. Overall, New F&B Vendor garners a composite business factor of 0.88 for the vendor information silo.

In regards to financial information, New F&B Vendor has two revolving lines of credit with which New F&B Vendor pays the vendors from which food and beverage are sourced. New F&B Vendor, as a point of pride, has never missed a payment to a supplier. New F&B Vendor has an attractive 3% interest rate on both lines of credit. New F&B Vendor maintains enough capital in liquid asset form to keep the business afloat for at least a year in the event that revenue dries up, or price swings of food and beverage products shrink or erase profit margin. The cushion allows New F&B Vendor to insulate, in part, customers from price fluctuations by offering a "consistent pricing guarantee", in which New F&B Vendor offers customer tex-mex restaurants the opportunity to lock in the price on any given product or selection of products for a contracted period of time up to one year. Overall, New F&B Vendor garners a composite business factor of 0.92 for the financial information silo.

In regards to business statistics information, New F&B Vendor generally bills customers on a monthly basis. The accounting department of New F&B, using the BMA, keeps track of all outstanding accounts receivable. When any customer is in arrears, the customer receives communication, starting at one month late, indicating that the overdue payment should be made as soon as possible. After three months on non-payment, New F&B ceases providing food and beverage to the non-paying tex-mex restaurant and begins again only if the account balance is paid. However, in twenty-seven years of business, only twice has a tex-mex restaurant been far enough behind to trigger stoppage of supply from New F&B Vendor. In other words, New F&B is generally paid on time. New F&B Vendor has, in addition to the owner, thirty-six regular employees. The employees have been on the job for an average of seven years. The rate of turnover is low due to the higher-than-industry-average wages paid to employees in addition to a strong benefits package. Overall, New F&B Vendor garners a composite business factor of 0.93 for the business statistics information silo.

In regards to usage information, as previously mentioned, New F&B Vendor has used the same BMA for twenty-seven years, and uses the BMA to manage all relevant aspects of the business. Long, continuous, and regular use of the BMA indicates that New F&B Vendor assiduously manages operations, and the length of time using the BMA creates a large data set on from which to derive composite business factors. Overall, New F&B Vendor garners a composite business factor of 0.98 for the usage information silo.

In regards to marketing information, New F&B Vendor regularly advertises in several trade and industry publications. New F&B Vendor also uses a marketing company that focuses on advertisements via the internet, such as via email, on the business website, via social media, etc. New F&B also responds well to marketing from the BMA seller, regularly making suggested updates to the software and engaging the BMA seller in response to new features and services of the BMA. Overall, New F&B Vendor garners a 0.89 composite business factor for the marketing information silo.

In regards to public information, New F&B Vendor never misses payments and has relatively few (i.e., two) lines of credit, which would ordinarily lead to high credit scores from credit rating agencies. However, acting on questionable advice from a family friend, the owner of New F&B Vendor decided to embark on an attempt to diversify the business by purchasing tex-mex themed artwork to sell to customers. However, the artwork adventure has fared poorly for New F&B Vendor. A large loan was secured by New F&B Vendor to purchase a large quantity of artwork, and for gallery space in which to display the artwork. New F&B Vendor keeps the two aspects of the business separate from one another, and while the main business of selling food and beverage products to tex-mex restaurants is doing great, the slow start to the artwork sales business has caused New F&B to regularly miss loan payments by several months. The missed loan payments cause new F&B to have low credit scores from all credit ratings agencies. In the most recent three months, the artwork business has shown signs of taking off as New F&B works the concept into their traditional sales and marketing channels, but the improvement is not reflected in the credit scores given by the credit ratings agencies. Overall, New F&B Vendor garners a composite business factor of 0.70 for the cached public information.

The business health score generator thus calculates the score as follows:

business health score (as a percentage)=$(0.15*CI+ 0.20*VI+0.10*FI+0.20*BSI+0.10*UI+0.10*MI+ 0.15*CPI)*100=(0.15*0.97+0.20*0.88+ 0.10*0.92+0.20*0.93+0.10*0.98+0.10*0.89+ 0.15*0.70)*100=89.15\%$ With a business health score of 89.15%, New F&B Vendor meets the minimum requirement of Fajita Al's (i.e., 85%). Thus, despite New F&B Vendor having public information that includes low credit scores, Fajita Al's decides to engage in business with New F&B Vendor.

Figure 5:
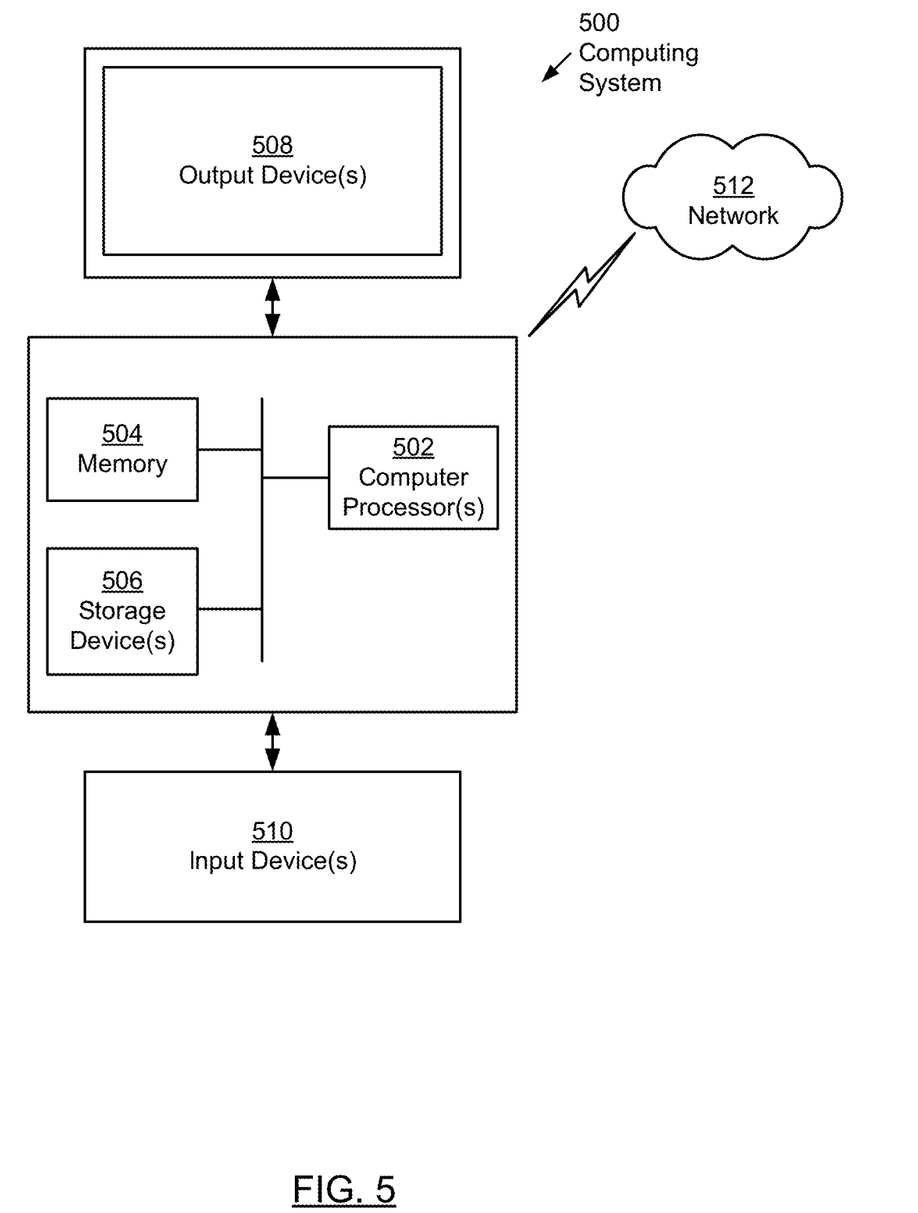
FIG. 5 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512).

Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a business health score of a business entity, comprising:
    identifying a plurality of tools used to manage the business entity;
    obtaining, over a network by a software as a service (SaaS) computer system from a plurality of business entities, business information from the plurality of tools;
    filtering, by a computer processor, the business information into at least customer information, vendor information and usage information,
        the customer information comprising customer payment information related to a customer payment to the business entity and information relating to the usage of a business management application (BMA) executing on the SaaS computer system by a plurality of customers of the business entity,
        the vendor information comprising vendor payment information related to a frequency with which the business entity fails to make payments to a vendor and whether the frequency is increasing over time,
        the usage information comprising the amount of time the business entity spends interacting with the BMA and the frequency with which the business entity uses the BMA;
    generating a machine learning model by providing a machine learning algorithm with training data to correlate actual business information from multiple business entities with the actual incidence of negative business situations;
    generating, by applying the machine learning model to the business information, the business health score of the business entity;
    obtaining a minimum business health score from an interested entity;
    determining the business health score of the business entity exceeds the minimum business health score from the interested entity; and
    presenting, in response to the business health score exceeding the minimum business health score, the business entity to the interested entity.

2. The method of claim 1, wherein the interested entity is one selected from a group consisting of the business entity, a customer, a vendor, and a lender.

3. The method of claim 1, further comprising:
    determining a plurality of business entities having business health scores below the minimum business health score; and
    offering a service to the plurality of business entities, wherein the service comprises plans for how to improve the business health scores of the plurality of business entities.

4. The method of claim 1, wherein the business information comprises public information and business management application (BMA) information, and wherein BMA information comprises customer information, vendor information, financial information, business statistics information, usage information, and marketing information.

5. The method of claim 4, wherein:
    the business statistics information comprises employee information related to an employee of the business entity.

6. The method of claim 1, wherein the machine learning algorithm is a weighted algorithm.

7. The method of claim 1, wherein the machine learning algorithm is a rules ensemble method.

8. The method of claim 1, wherein the business health score comprises at least one selected from a group consisting of a number score, a percentage score, and a letter score.

9. A software as a service (SaaS) computer system for generating a business health score of a business entity, comprising:
    a computer processor;
    a business management application (BMA) executing on the SaaS computer system configured to obtain and store BMA information from the business entity;
    a business health score tool executing on the computer processor and configured to:
        identify a plurality of tools used to manage the business entity, wherein the plurality of tools comprises the BMA,
        obtain, over a network from a plurality of business entities, business information from the tools,
        filter the business information into at least customer information, vendor information and usage information,
        the customer information comprising customer payment information related to a customer payment to the business entity and information relating to the usage of the BMA by a plurality of customers of the business entity,
        the vendor information comprising vendor payment information related to a frequency with which the business entity fails to make payments to a vendor and whether the frequency is increasing over time,
        the usage information comprising the amount of time the business entity spends interacting with the BMA and the frequency with which the business entity uses the BMA,
        obtain a minimum business health score from an interested entity,
        determine a business health score of the business entity exceeds the minimum business health score from the interested entity, and
        present, in response to the business health score exceeding the minimum business health score, the business entity to the interested entity; and
    a business health score generator executing on the computer processor and configured to:
        generate a machine learning model by providing a machine learning algorithm with training data to correlate actual business information of multiple business entities with the actual incidence of negative business situations, generate, by applying the machine learning model to the business information, the business health score of the business entity.

10. The system of claim 9, wherein the interested entity is one selected from a group consisting of the business entity, a customer, a vendor, and a lender.

11. The system of claim 9, wherein the business health score tool is further configured to:
determine a plurality of business entities having business health scores below the minimum business health score; and
offer a service to the plurality of business entities, wherein the service comprises plans for how to improve the business health scores of the plurality of business entities.

12. The system of claim 9, wherein the business information further comprises public information.

13. The system of claim 9, wherein BMA information comprises customer information, vendor information, financial information, business statistics information, usage information, and marketing information.

14. The system of claim 13, wherein:
the business statistics information comprises employee information related to an employee of the business entity.

15. The system of claim 9, wherein the business health score comprises at least one selected from a group consisting of a number score, a percentage score, and a letter score.

16. The system of claim 9, wherein the machine learning algorithm is a weighted algorithm.

17. The system of claim 9, wherein the machine learning algorithm is a rules ensemble method.

18. A non-transitory computer readable medium comprising instructions for generating a business health score of a business entity which, when executed by a software as a service (SaaS) computer, cause a computer processor to:
identify a plurality of tools used to manage the business entity;
obtain, over a network from a plurality of business entities, business information from the plurality of tools;
filter, by a computer processor, the business information into at least customer information, vendor information and usage information,
the customer information comprising customer payment information related to a customer payment to the business entity and information relating to the usage of a business management application (BMA) executing on the SaaS computer by a plurality of customers of the business entity,
the vendor information comprising vendor payment information related to a frequency with which the business entity fails to make payments to a vendor and whether the frequency is increasing over time,
the usage information comprising the amount of time the business entity spends interacting with the BMA and the frequency with which the business entity uses the BMA;
generate a machine learning model by providing a machine learning algorithm with training data to correlate actual business information of multiple business entities with the actual incidence of negative business situations;
generate, by applying the machine learning model to the business information, the business health score of the business entity;
obtain a minimum business health score from an interested entity;
determine the business health score of the business entity exceeds the minimum business health score from the interested entity; and
present, in response to the business health score exceeding the minimum business health score, the business entity to the interested entity.

19. The non-transitory computer readable medium of claim 18, wherein the interested entity is one selected from a group consisting of the business entity, a customer, a vendor, and a lender.

20. The non-transitory computer readable medium of claim 18, further comprising instructions which, when executed by the computer, cause the computer processor to:
determine a plurality of business entities having business health scores below the minimum business health score; and
offer a service to the plurality of business entities, wherein the service comprises plans for how to improve the business health scores of the plurality of business entities.

21. The non-transitory computer readable medium of claim 18, wherein the tools comprise public information and business management application (BMA) information, and wherein BMA information comprises customer information, vendor information, financial information, business statistics information, usage information, and marketing information.

22. The non-transitory computer readable medium of claim 21, wherein:
the business statistics information comprises employee information related to an employee of the business entity.

23. The non-transitory computer readable medium of claim 18, wherein the machine learning algorithm is a weighted algorithm.

24. The non-transitory computer readable medium of claim 18, wherein the machine learning algorithm is a rules ensemble method.

* * * * *